United States Patent
Kim et al.

(10) Patent No.: US 11,742,689 B2
(45) Date of Patent: Aug. 29, 2023

(54) POWER SENSING CIRCUIT AND ELECTRONIC DEVICE INCLUDING THE SAME

(71) Applicant: Samsung Electronics Co., Ltd., Suwon-si (KR)

(72) Inventors: Hyunsu Kim, Suwon-si (KR); Hyoungseok Oh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 179 days.

(21) Appl. No.: 17/172,117

(22) Filed: Feb. 10, 2021

(65) Prior Publication Data
US 2021/0249891 A1 Aug. 12, 2021

(30) Foreign Application Priority Data

Feb. 11, 2020 (KR) .................. 10-2020-0016637
Sep. 21, 2020 (KR) .................. 10-2020-0121789

(51) Int. Cl.
*H02J 7/04* (2006.01)
*H02J 50/80* (2016.01)
*H02J 7/00* (2006.01)

(52) U.S. Cl.
CPC ............ *H02J 7/04* (2013.01); *H02J 7/00032* (2020.01); *H02J 50/80* (2016.02); *H02J 2207/20* (2020.01)

(58) Field of Classification Search
CPC .................................................. H02J 50/80
See application file for complete search history.

(56) References Cited

U.S. PATENT DOCUMENTS 4,387,332 A * 6/1983 Oyamada .............. H02J 7/0024
320/124
4,584,690 A * 4/1986 Cafiero ............... H04L 25/4925
375/348

(Continued)

FOREIGN PATENT DOCUMENTS

KR     1020190042401 A     4/2019

OTHER PUBLICATIONS

Wireless Power Receiver for Low Power Applications P9222-R Datasheet (Year: 2019).*

(Continued)

*Primary Examiner* — Drew A Dunn
*Assistant Examiner* — Tynese V McDaniel
(74) *Attorney, Agent, or Firm* — Muir Patent Law, PLLC

(57) ABSTRACT

An electronic device configured to operate in a plurality of power modes includes a power receiving circuit receiving wireless power from an power transmitting device; and a processor configured to control an operation of the electronic device, wherein the plurality of power modes include a power charging mode in which the wireless power is continuously provided, a power hold mode in which a state where the wireless power is provided and a state where the wireless power is cut off are periodically repeated in a ping period, and a power cutoff mode in which the wireless power is cut off, wherein the power receiving circuit generates a ping flag signal alternates between a high level and a low level with the ping period in the power hold mode, and changes the power mode based on a counting value obtained by counting particular level sections of the ping flag signal.

20 Claims, 11 Drawing Sheets

(56) References Cited

U.S. PATENT DOCUMENTS

| | | | | |
|---|---|---|---|---|
| 5,144,218 A | * | 9/1992 | Bosscha | G01R 31/3648 |
| | | | | 320/DIG. 21 |
| 5,357,203 A | * | 10/1994 | Landau | H02J 7/00036 |
| | | | | 324/435 |
| 5,790,613 A | * | 8/1998 | Tateishi | H04L 7/033 |
| | | | | 375/376 |
| 5,808,446 A | * | 9/1998 | Eguchi | H02J 7/00711 |
| | | | | 320/152 |
| 6,141,538 A | * | 10/2000 | Consolazio | H04B 1/40 |
| | | | | 455/68 |
| 6,265,789 B1 | * | 7/2001 | Honda | H01F 38/14 |
| | | | | 307/106 |
| 6,313,612 B1 | * | 11/2001 | Honda | H02J 7/0044 |
| | | | | 320/139 |
| 8,643,362 B2 | | 2/2014 | Sekiguchi et al. | |
| 9,239,810 B2 | * | 1/2016 | Chen | G06F 13/4072 |
| 9,509,171 B2 | | 11/2016 | Lundgren et al. | |
| 10,498,176 B2 | * | 12/2019 | Park | H04B 5/0037 |
| 10,978,921 B1 | * | 4/2021 | Wang | H02J 50/10 |
| 11,289,951 B2 | * | 3/2022 | Ha | H02J 50/60 |
| 2008/0197713 A1 | * | 8/2008 | Jin | H02J 7/00045 |
| | | | | 307/104 |
| 2009/0026844 A1 | * | 1/2009 | Iisaka | H02J 50/12 |
| | | | | 307/104 |
| 2009/0133942 A1 | * | 5/2009 | Iisaka | H02J 50/10 |
| | | | | 320/108 |
| 2010/0084918 A1 | * | 4/2010 | Fells | H02J 50/402 |
| | | | | 307/32 |
| 2013/0225077 A1 | * | 8/2013 | Schultz | H02J 50/80 |
| | | | | 455/41.1 |
| 2013/0285465 A1 | * | 10/2013 | Takeda | H04L 25/0266 |
| | | | | 307/104 |
| 2014/0084832 A1 | * | 3/2014 | Sato | H01M 10/613 |
| | | | | 318/452 |
| 2014/0306657 A1 | * | 10/2014 | Lundgren | H02J 50/12 |
| | | | | 320/108 |
| 2014/0312836 A1 | * | 10/2014 | Lundgren | H02J 50/80 |
| | | | | 320/108 |
| 2015/0069852 A1 | * | 3/2015 | Lindstrom | H04B 5/0031 |
| | | | | 307/104 |
| 2015/0102779 A1 | * | 4/2015 | Schumacher | H02J 7/00711 |
| | | | | 320/141 |
| 2015/0249484 A1 | * | 9/2015 | Mach | H02J 50/10 |
| | | | | 307/104 |
| 2015/0263531 A1 | * | 9/2015 | Kozakai | H02J 50/12 |
| | | | | 307/104 |
| 2016/0204642 A1 | * | 7/2016 | Oh | H02J 50/60 |
| | | | | 320/108 |
| 2017/0207657 A1 | * | 7/2017 | Kotani | H02J 7/007184 |
| 2018/0131234 A1 | * | 5/2018 | Uchimoto | H04B 5/0031 |
| 2019/0137554 A1 | * | 5/2019 | Liu | H02J 50/12 |
| 2019/0148986 A1 | * | 5/2019 | Yoo | H02J 50/12 |
| | | | | 307/104 |
| 2019/0173309 A1 | * | 6/2019 | Jung | H02J 50/80 |
| 2019/0200961 A1 | | 7/2019 | Specht et al. | |
| 2019/0214854 A1 | * | 7/2019 | Leem | H02J 50/20 |
| 2019/0334366 A1 | * | 10/2019 | Blaha | H04B 5/0081 |
| 2020/0204009 A1 | * | 6/2020 | Park | H02J 50/20 |
| 2020/0313460 A1 | * | 10/2020 | Lee | H02J 50/12 |
| 2021/0083518 A1 | * | 3/2021 | Stingu | G01R 33/10 |
| 2021/0194296 A1 | * | 6/2021 | Jo | H02J 50/80 |
| 2021/0249913 A1 | * | 8/2021 | Ha | H02J 50/80 |
| 2021/0281123 A1 | * | 9/2021 | Sherman | H04B 5/0075 |
| 2021/0305848 A1 | * | 9/2021 | Song | H02J 50/402 |
| 2021/0313842 A1 | * | 10/2021 | Shichino | H02J 50/10 |
| 2021/0313844 A1 | * | 10/2021 | Kim | H02J 7/0047 |
| 2021/0329114 A1 | * | 10/2021 | Lin | H04M 1/727 |
| 2021/0399590 A1 | * | 12/2021 | Yun | H02J 7/342 |
| 2022/0200344 A1 | * | 6/2022 | Toula | H02J 7/04 |

OTHER PUBLICATIONS

Wireless Power Receiver for Low Power Applications, P9222-R Datasheet, 2019 Integrated Device Technology, Inc., Sep. 27, 2019 (available at https://www.renesas.com/us/en/document/dst/p9222-r-datasheet) (52 pages).

* cited by examiner

POWER SENSING CIRCUIT AND ELECTRONIC DEVICE INCLUDING THE SAME

CROSS-REFERENCE TO RELATED APPLICATIONS

This application is based on and claims priority under 35 U.S.C. § 119 to Korean Patent Application Numbers 10-2020-0016637, filed on Feb. 11, 2020, and 10-2020-0121789, filed on Sep. 21, 2020, in the Korean Intellectual Property Office, the disclosures of both of which are incorporated by reference herein in their entirety.

BACKGROUND

The inventive concept relates to a power sensing circuit and an electronic device including the same, and more particularly, to a wireless power sensing circuit and an electronic device including the same.

Recently, a wireless charging technology using an electromagnetic induction method or a magnetic resonance method has been applied to electronic devices such as smart phones. When a power transmitting device (for example, a wireless charging pad) and a power receiving device (for example, a smart phone) approach each other within a certain distance, a battery of the power transmitting device may be charged by electromagnetic induction or a resonance phenomenon between a transmitting coil of the power transmitting device and a receiving coil of the power receiving device. Accordingly, users of the electronic device may charge the electronic device more conveniently than a conventional wired charging technology in which charging by connecting a charging terminal of the electronic device to the electronic device is performed.

SUMMARY

The inventive concept provides a wireless power sensing circuit and an electronic device including the same.

According to an aspect of the inventive concept, there is provided an electronic device configured to operate in a plurality of power modes including: a power receiving circuit configured to receive wireless power from an external power transmitting device; and a processor configured to control an operation of the electronic device, wherein the plurality of power modes include a power charging mode in which the wireless power is continuously provided, a power hold mode including a state in which the wireless power is provided and a state in which the wireless power is cut off are periodically repeated in a ping period, and a power cutoff mode in which the wireless power is continuously cut off, and wherein the power receiving circuit configured to generate a ping flag signal alternates between a high level and a low level with the ping period in the power hold mode, and changes the power mode based on a counting value obtained by counting particular level sections of the ping flag signal.

According to another aspect of the inventive concept, there is provided an electronic device receiving wireless power from a power transmitting device including: a power receiving circuit configured to receive power from an external power transmitting device; and a processor configured to control the power receiving circuit, wherein the power receiving circuit includes: a power converting circuit configured to rectify the received power and generate a rectified voltage; and a power sensing circuit configured to output a sensing result signal according to a result of sensing a receiving state of the power in response to a ping enable signal received from the processor, wherein the power sensing circuit outputs the sensing result signal, according to a result of counting particular level sections of a ping flag signal alternating between a high level and a low level in a same period as a period of the rectified voltage.

According to another aspect of the inventive concept, there is provided a power receiving circuit including: a power converting circuit configured to generate a rectified voltage by rectifying power received from outside the power receiving circuit; and a power sensing circuit configured to output a sensing result signal according to a result of sensing a receiving state of the power, in response to a ping enable signal received from a processor, wherein the power sensing circuit includes: a flag signal generator configured to generate a ping flag signal from the rectified voltage; a counter configured to generate a counting value by counting particular level sections of the ping flag signal; a digital comparator configured to generate a switching signal by comparing the counting value with a reference digital value; and a first pin configured to output the sensing result signal according to the switching signal.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, desirable embodiments of the inventive concept are described in detail in conjunction with the accompanying drawings.

Figure 1:
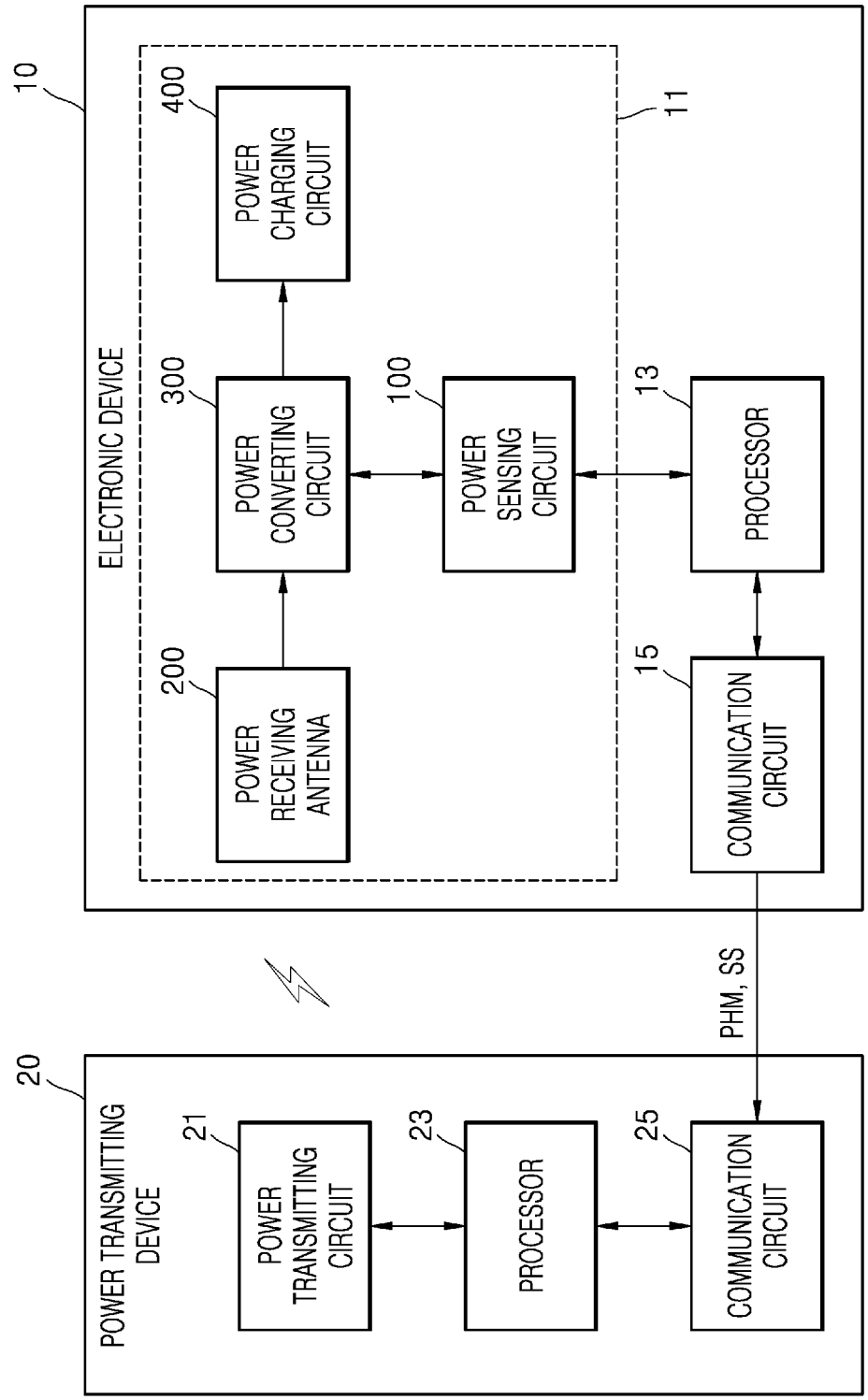
FIG. 1 is a diagram of a wireless power charging system, according to an example embodiment of the inventive concept.
Figure 2:
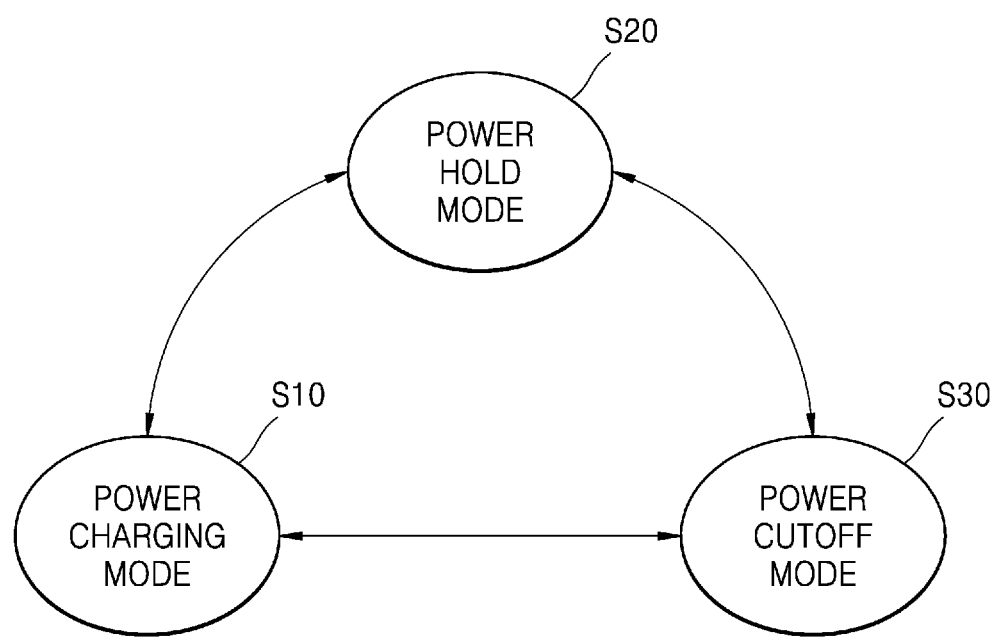
FIG. 2 is a diagram of power modes of a wireless power charging system, according to an example embodiment of the inventive concept.

FIG. 1 is a diagram of a wireless power charging system, according to an example embodiment of the inventive concept. FIG. 2 is a diagram of power modes of a wireless power charging system, according to an example embodiment of the inventive concept.

Referring to FIG. 1, the wireless power charging system may include a power transmitting device 20 and an electronic device. The electronic device may be referred to as a power receiving device 10 receiving wireless power from the power transmitting device 20.

The power transmitting device 20 may wirelessly transmit power to at least one power receiving device 10. For example, the power transmitting device 20 may transmit wireless power by using electromagnetic waves. In an example embodiment, the power transmitting device 20 may wirelessly transmit power to a wireless power receiving device 10 authenticated by a certain authentication procedure.

The power transmitting device 20 may include a power transmitting circuit 21, a processor 23, and a communication circuit 25. The power transmitting circuit 21 may provide power required by the power transmitting device 20, and may wirelessly provide power to the power receiving device 10. For example, the power transmitting circuit 21 may supply power in a form of an alternating current (AC) waveform, and may supply power of the AC waveform by converting power of a direct current (DC) waveform into the AC waveform.

The power transmitting circuit 21 may further include a transmitting coil which is a power transmitting antenna, and accordingly, may transmit or receive a certain electromagnetic wave. Inductance of the transmitting coil of the power transmitting circuit 21 may be changeable. The power transmitting circuit 21 may be implemented as various types of circuits capable of providing the power of the AC waveform and transceiving electromagnetic waves.

The processor 23 may control overall operations of the power transmitting device 20. The processor 23 may control the overall operation of the power transmitting device 20 by using an algorithm, a program, or an application required for controlling, which are read from a memory of the power transmitting device 20. The processor 23 may include at least one of, for example, a central processing unit (CPU), a graphics processing unit (GPU), a microprocessor, an application specific integrated circuit (ASIC), field programmable gate arrays (FPGA), an application processor (AP), and may include a plurality of cores.

The communication circuit 25 may communicate with the power receiving device 10 in a certain manner. The communication circuit 25 may communicate with a communication circuit 15 of the power receiving device 10 by using near field communication (NFC), Zigbee communication, infrared communication, visible light communication, a Bluetooth method, a Bluetooth low energy method, etc.

The communication circuit 25 may transmit a signal for information about the power transmitting device 20 to the power receiving device 10. The communication circuit 25 may receive a signal for information about the power receiving device 10 from the power receiving device 10, or may receive a signal from other power transmitting devices.

FIG. 1 illustrates that the power transmitting circuit 21 and the communication circuit 25 are separate components, and the power transmitting device 20 communicates in an out-band format, but this is an example. In the power transmitting device 20 according to the inventive concept, the power transmitting circuit 21 and the communication circuit 25 may be implemented as one piece of hardware, so that the power transmitting device 20 performs communication in an in-band format.

The power receiving device 10 may receive wireless power from the power transmitting device 20. The power receiving device 10 may include a power receiving circuit 11, a processor 13, and the communication circuit 15. In an example embodiment, the power receiving device 10 may not include some components, or may include additional components. For example, the power receiving device 10 may further include a matching circuit for matching impedance to a power receiving antenna 200 of the power receiving circuit 11. Some of the components of the power receiving device 10 may be combined in a single body, while functions of the corresponding constituent elements before the combination are performed in the same manner.

The power receiving circuit 11 may include a power sensing circuit 100, the power receiving antenna 200, a power converting circuit 300, and a power charging circuit 400. In an example embodiment, the power receiving circuit 11 may be implemented by using at least a portion of a power management integrated circuit (PMIC). In FIG. 1, it is illustrated that the power receiving circuit 11 includes the power sensing circuit 100, but the power receiving device 10 according to the inventive concept is not limited thereto, and the power sensing circuit 100 may be implemented as a separate configuration from the power receiving circuit 11. For example, the power sensing circuit 100 may be implemented as a separate chip. Alternatively, for example, the power sensing circuit 100 may be included in the processor 13.

The power receiving antenna 200 may receive wireless power from the power transmitting device 20. For example, the power receiving antenna 200 may include a receiving coil, and the receiving coil may receive power transmitted from the power transmitting apparatus 20 in an electromagnetic induction method. The receiving coil of the power receiving antenna 200 may have a circular shape, an oval shape, a square shape, or a rounded square shape. According to an example embodiment, the power receiving antenna 200 may receive power transmitted from the power transmitting device 20 by an electromagnetic resonance method.

The power converting circuit 300 may convert power having a certain frequency received from the power receiving antenna 200 into DC power and output the DC power. The power converting circuit 300 may include, for example, a rectifier circuit that converts AC power into DC power.

The power charging circuit 400 may charge a battery by using an output power of the power converting circuit 300. For example, the power charging circuit 400 may include a battery, and may charge the battery by using a rectified voltage output from the power converting circuit 300.

The power sensing circuit 100 may sense power received via the power receiving antenna 200. For example, the power sensing circuit 100 may sense the rectified voltage (for example, VRECT in FIG. 5) output from the power converting circuit 300, sense a state of power transmission and/or reception between the power transmitting device 20 and the power receiving device 10 by using the sensed voltage, and output a sensing result signal (for example, PDET_B in FIG. 5) according to the sensing result.

In an example embodiment, the power sensing circuit 100 may sense the rectified voltage in a power hold mode, and when it is determined that a ping is not periodically received from the power transmitting device 20, the sensing result signal PDET_B with a level thereof changed may be output. After receiving the sensing result signal PDET_B, the processor 13 may change a power mode accordingly.

The processor 13 may, for example, control at least one other component (for example, a hardware or software component) of the power receiving device 10 by driving software, and perform various data processing and operations. The processor 13 may control the power receiving circuit 11 and the communication circuit 15.

The processor 13 may include, for example, at least one of a CPU, a GPU, a microprocessor, an ASIC, an FPGA, and an AP, and may have a plurality of cores. According to an example embodiment, the processor 13 may include an AP, the power receiving device 10 may operate independently of the processor 13, and additionally or alternatively, use lower power than the processor 13, or may further include an auxiliary coprocessor specialized for certain functions (for example, a GPU, an image signal processor, a sensor hub processor, or a communication processor).

The processor 13 may provide a ping enable signal (for example, PING_EN in FIG. 5) to the power sensing circuit 100 to perform a ping sensing operation in a power hold mode (for example, S20 in FIG. 2). The power sensing circuit 100 may perform the ping sensing operation in response to the ping enable signal PING_EN, and provide the sensing result signal PDET_B according to the performance result to the processor 13.

The communication circuit 15 of the power receiving device 10 may communicate with the communication circuit 25 of the power transmitting device 20. For example, the communication circuit 15 may communicate (in the in-band format) by using a frequency band used in the transmitting coil of the power transmitting device 20, or, for example, the communication circuit 15 may communicate (in the out-band format) by using a frequency different from a frequency used for power transmission in the transmitting coil. The communication circuit 15 may transmit a signal including information about a charging state of the power receiving device 10. For example, the communication circuit 15 may transmit a power hold mode (PHM) packet to change the power mode to the power hold mode (e.g., power hold mode S20 of FIG. 2) in which a charging rate of the power receiving device 10 is relatively low, and may transmit a signal strength packet (SS) that is a response according to receiving a ping in the power hold mode (e.g., power hold mode S20 of FIG. 2).

Referring to FIGS. 1 and 2, the wireless power charging system may operate in a plurality of power modes. The plurality of power modes may include a power charging mode S10, the power hold mode S20, and a power cutoff mode S30.

In the power charging mode S10, the power transmitting device 20 may provide power for wirelessly charging the power receiving device 10, and the power receiving device 10 may receive power and charge an internal battery. For example, in the power charging mode S10, the power transmitting device 20 may continuously transmit wireless power to the power receiving device 10, and the power receiving device 10 may continuously receive the wireless power.

When the internal temperature of the power receiving device 10 is excessively increased or the battery inside the power receiving device 10 is completely charged, to reduce a charging speed of the power receiving device 10, the wireless power charging system may perform the charging operation by changing a mode from the charging mode S10 to the power hold mode S20. Accordingly, in the power charging mode S10, the rate at which the temperature of the power receiving device 10 increases may decrease.

In the power hold mode S20, a state may be periodically repeated in which the power from the power transmitting device 20 is supplied to or cut off at the power receiving device 10. For example, the power transmitting device 20 may provide a ping that means the power is supplied to or cut off at the power receiving device 10, repeatedly and at a certain period, and the power receiving device 10 may sense the ping. In an example embodiment, the power receiving device 10 may generate a ping flag signal (for example, PING_FLAG in FIG. 5) may alternate a high level and a low level with a ping period in the power hold mode S20, and may sense the ping based on a counting value (for example, CV in FIG. 5) that is a result of counting low level sections of the ping flag signal PING_FLAG. The power receiving device 10 may change the power mode from the power hold mode S20 to another power mode, for example, the power cutoff mode S30, according to the result of the ping sensing operation in the power hold mode S20.

In the power cutoff mode S30, the power transmitting device 20 may not provide power to the power receiving device 10. For example, the wireless power may be continuously cut off at the power receiving device 10 in the power cutoff mode S30. The power receiving device 10 may operate by using internal power charged in the internal battery.

Figure 3:
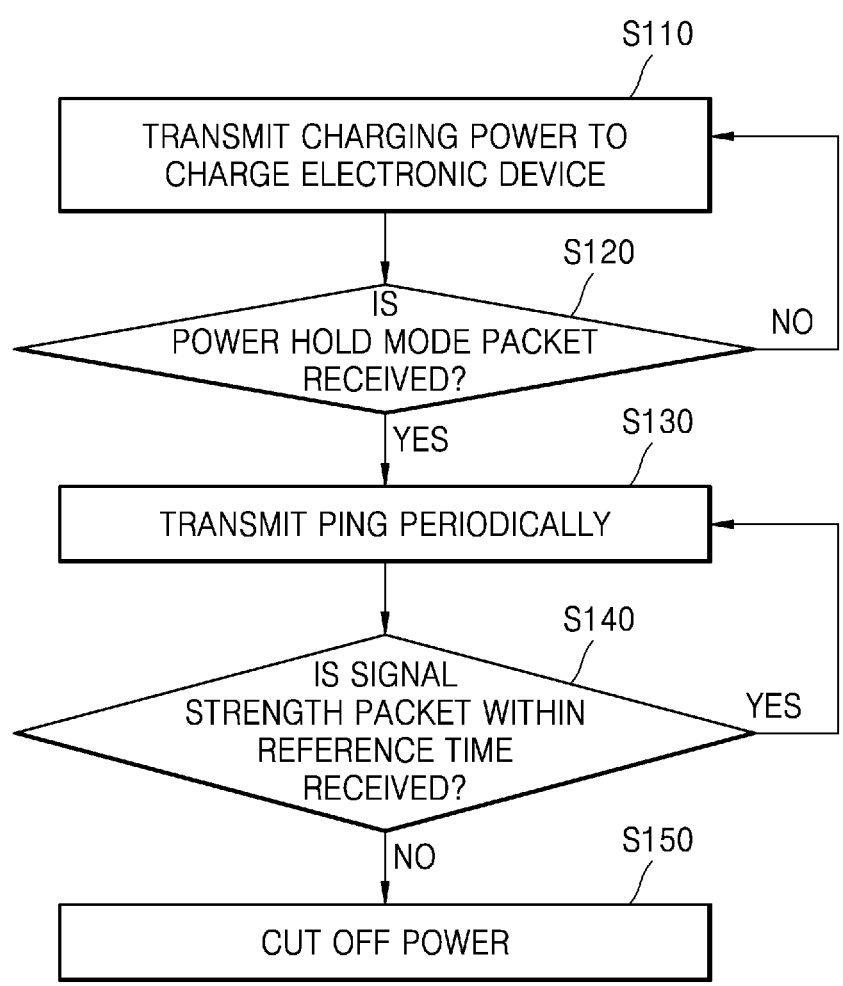
FIG. 3 is a flowchart of an operation method of a power transmitting device in a wireless power charging system, according to an example embodiment of the inventive concept.
Figure 4:
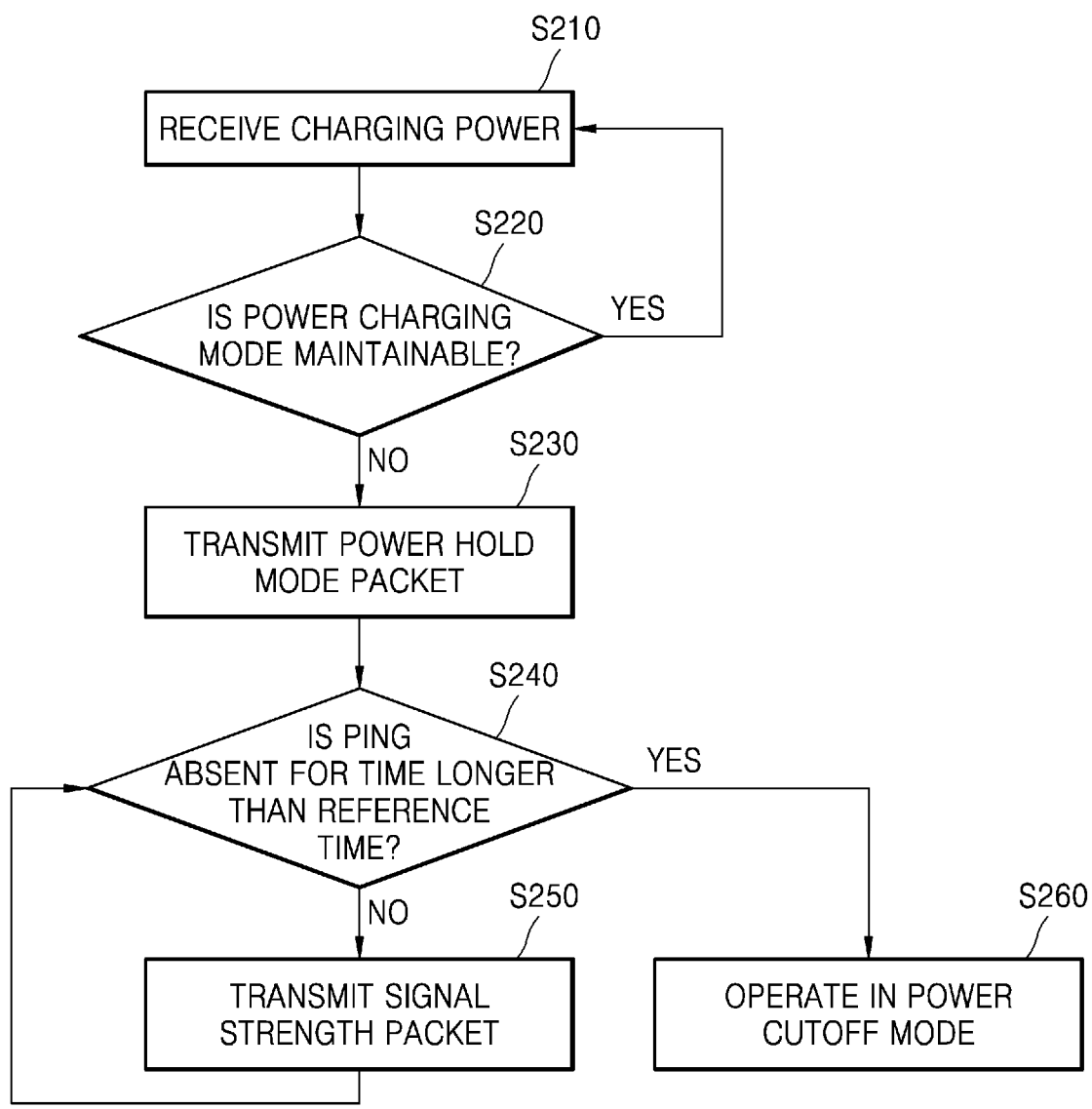
FIG. 4 is a flowchart of an operation method of a power receiving device in a wireless power charging system, according to an example embodiment of the inventive concept.

FIG. 3 is a flowchart of an operation method of the power transmitting device 20 in the wireless power charging system, according to an example embodiment of the inventive concept. FIG. 4 is a flowchart an operation method of a power receiving device 10 in a wireless power charging system, according to an example embodiment of the inventive concept.

Referring to FIGS. 1 and 3, the power transmitting device 20 may transmit charging power for charging the electronic device 10, that is, the power receiving device 10 (S110). Operation S110 may correspond to the power charging mode S10 described with reference to FIG. 2.

The power transmitting device 20 may determine whether a power hold mode (PHM) packet is received from the power receiving device 10 (S120). When the power transmitting device 20 does not receive the PHM packet (S120, No), the power transmitting device 20 may maintain the power charging mode S10 and continue to perform operation S110.

When the power transmitting device 20 receives the PHM packet (S120, Yes), the power transmission device 20 may block power that has been continuously transmitted to the power receiving device 10, and transmit the ping periodically (S130). In this case, the ping may be defined as a state in which power is temporarily provided within the ping period. For example, the power transmitting device 20 may repeat a state of periodically providing power to the power receiving device 10 (the ping) and a state of not providing power. Operation S130 may correspond to the power hole mode S20 described with reference to FIG. 2.

The power transmitting device 20 may determine whether a signal strength (SS) packet is received from the power receiving device 10 within a reference time (S140). When the SS packet is received within the reference time (S140, Yes), the power transmitting device 20 may perform operation S130 again.

In an example embodiment, the reference time may be twice the ping period, and for example, in operation S140, the power transmitting device 20 may determine whether a certain SS packet has been absent two or more times. For example, the power transmitting device 20 may determine if an SS packet has been received within two ping periods.

When it is determined that the power transmitting device 20 has not received the SS packet during the reference time (S140, No), the power transmitting device 20 may determine that the power receiving device 10 is detached, and may cut off power provided to the power receiving device 10. For example, if the power transmitting device 20 determines that the power receiving device 10 is detached, the power transmitting device 20 may stop providing the wireless power to the power receiving device 10.

Referring to FIGS. 1 and 4, the power receiving device 10 may receive charging power (S210). Operation S210 may correspond to the power charging mode S10 described with reference to FIG. 2.

The power receiving device 10 may determine whether the battery is in a chargeable state and the power charging mode S10 is maintainable (S220). When it is determined that the power receiving device 10 is in the chargeable state and the power charging mode S10 is maintainable (S220, Yes), the power charging mode S10 may be maintained and operation S110 of FIG. 3 may be performed. Examples of operation S220 is described in detail with reference to FIGS. 8 and 10.

When it is determined that the power charging mode S10 is not maintainable (S220, No), the power receiving device 10 may transmit the PHM packet to the power transmitting device 20 (S230). The power receiving device 10 may determine whether the ping is absent for a time equal to or longer than the reference time (S240). Because the power transmitting device 20 transmits the ping when the PHM packet is received, by determining whether the ping is periodically received, it may be determined whether the power transmitting device 20 operates in the power hold mode S20, or is in a state of being separated from the power receiving device 10 (a state of wireless power cutoff). Operation S240 may correspond to the power hole mode S20 described with reference to FIG. 2.

In an example embodiment, the reference time may be twice the ping period, but this is an example and is not limited thereto. The reference time may be changed in various ways. For example, the power receiving device 10 may count a length of time of no ping (the absence of the ping) by using a clock signal generated internally, and may perform operation S230 by comparing a counted value with a reference digital value corresponding to the reference time. Accordingly, the power receiving device 10 according to the inventive concept may perform the ping sensing operation even without a control of an external processor. A configuration and operation of sensing the ping is described later in detail with reference to FIGS. 5 and 6.

When the ping is received within the reference time (S240, No), the power receiving device 10 may transmit the SS to the power transmitting device 20 as a response to the ping (S250). After the SS is transmitted, operation S240 may be performed again.

When there is no ping for a time longer than the reference time (S240, Yes), the power receiving device 10 may determine a state in which power is not provided from the power transmitting device 20, that is, as the state of being separated from the power transmitting device 20, and may operate in the power cutoff mode (for example, S30 in FIG. 2) (S260). For example, the power sensing circuit 100 of the power receiving device 10 may provide the sensing result signal to the processor 13, and the processor 13 may operate in the power cutoff mode S30.

Figure 5:
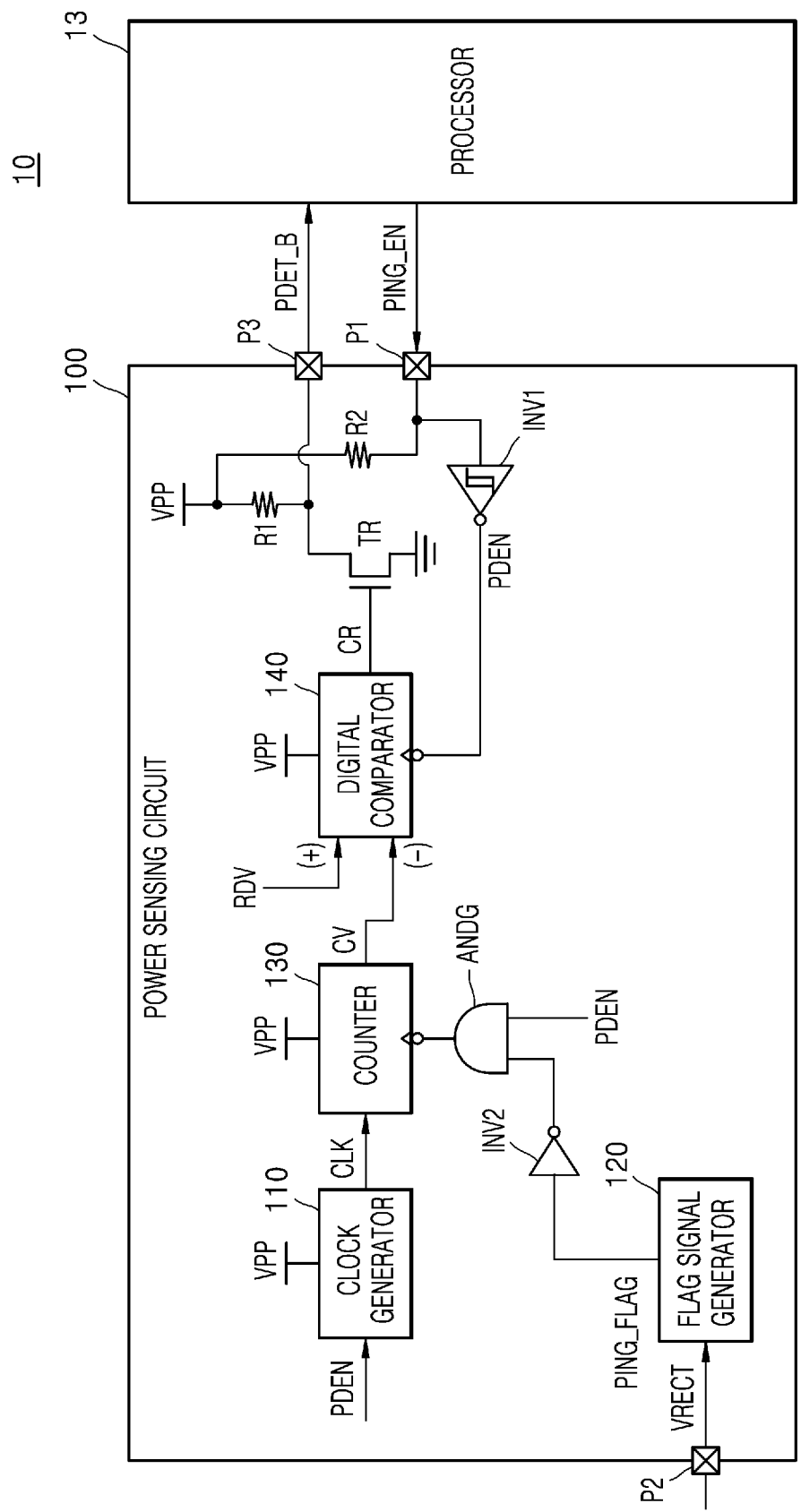
FIG. 5 is a diagram illustrating a power sensing circuit and a processor of a power receiving device, according to an example embodiment of the inventive concept.
Figure 6:
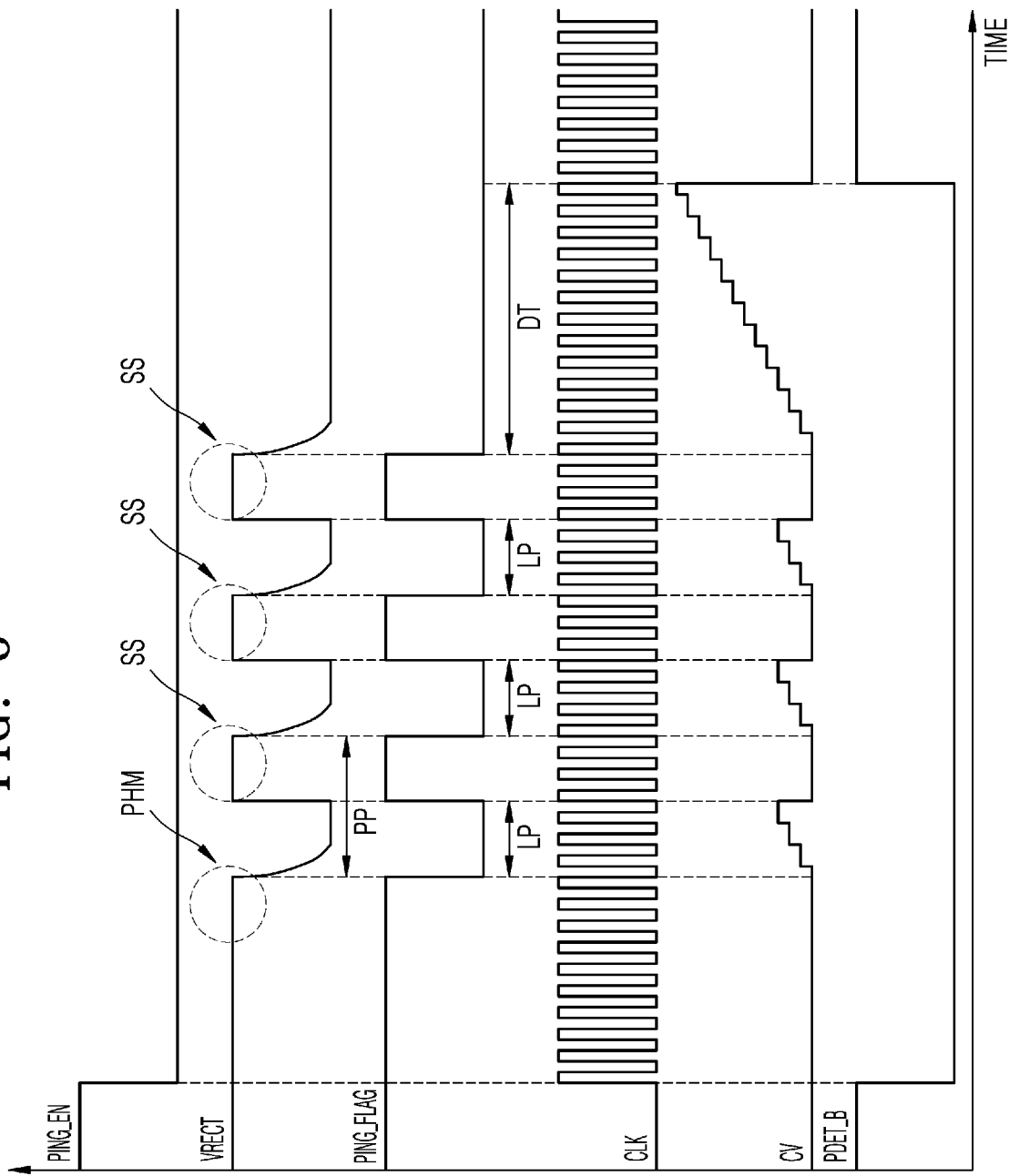
FIG. 6 is a waveform diagram of signals for explaining an operation of a power sensing circuit of a power receiving device, according to an example embodiment of the inventive concept.

FIG. 5 is a diagram illustrating the power sensing circuit 100 and the processor 13 of the power receiving device 10, according to an example embodiment of the inventive concept. FIG. 6 is a waveform diagram of signals for explaining an operation of the power sensing circuit 100 of the power receiving device 10, according to an example embodiment of the inventive concept.

Referring to FIG. 5, the power receiving device 10 may include the power sensing circuit 100 for detecting the wireless power provided by the power transmitting device 20, and the processor 13 for controlling the overall operation of the power receiving device 10. The power sensing circuit 100 may include a clock generator 110, a flag signal generator 120, a counter 130, and a digital comparator 140.

When the ping enable signal PING_EN of a certain level (for example, a low level) is received from the processor 13, the power sensing circuit 100 may perform the ping sensing operation by using the rectified voltage VRECT, and may output a result of performing the ping sensing operation as the sensing result signal PDET_B to the processor 13. In an example embodiment, the power sensing circuit 100 may include first through third pins P1 through P3. The power sensing circuit 100 may receive the ping enable signal PING_EN from the processor 13 via the first pin P1, receive a rectified voltage VRECT from the power converting circuit (for example, power converting circuit 300 in FIG. 1) via the second pin P2, and output the sensing result signal PDET_B to the processor 13 via the third pin P3.

In an example embodiment, the ping enable signal PING_EN may be received by a first inverter INV1 included in the power sensing circuit 100, and the first inverter INV1 may output an inverted enable signal PDEN. For example, the first inverter INV1 may include a hysteresis inverter.

The clock generator 110 may generate a clock signal CLK, which is a square wave with a constant period, in response to the inverted enable signal PDEN. For example, when the inverted enable signal PDEN is at a high level, the clock generator 110 may generate the clock signal CLK. For example, when the ping enable signal PING_EN changes from a high level to a low level, the clock generator 110 may start to generate the clock signal CLK.

However, the power sensing circuit 100 according to the inventive concept is not limited to including the clock generator 110 for generating the clock signal CLK therein. In some embodiments, the power sensing circuit 100 may receive the clock signal CLK from the outside (e.g., outside the power sensing circuit 100).

The flag signal generator 120 may receive the rectified voltage VRECT from the power converting circuit 300, and generate the ping flag signal PING_FLAG. The power converting circuit 300 may output the rectified voltage VRECT that periodically alternates between a high level and a low level as the ping is received from the power transmitting device 20 in the power hold mode (for example, power hold mode S20 in FIG. 2). The flag signal generator 120 may generate the ping flag signal PING_FLAG having a square wave and the same period as a period of the rectified voltage VRECT. For example, the ping flag signal PING_FLAG may have a high level when the rectified voltage VRECT is above a certain value (for example, a high level), and the ping flag signal PING_FLAG may have a square waveform of a low level when the rectified voltage VRECT is less than a certain value (for example, a low level).

The power sensing circuit 100 may include a second inverter INV2 that inverts the ping flag signal PING_FLAG, and may include an AND gate ANDG that receives the inverted ping flag signal PING_FLAG and the inverted enable signal PDEN and outputs a logical-multiplied signal of them. The signal output via the AND gate ANDG may be provided to the counter 130. For example, the AND gate ANDG may provide the inverted ping flag signal PING_FLAG to the counter 130 when the inverted enable signal PDEN is at a high level, and may provide a low level signal to the counter 130 when the inverted enable signal PDEN is at a low level. In FIG. 5, the power sensing circuit 100 is illustrated to include the AND gate ANDG, but the power sensing circuit 100 according to the inventive concept is not limited thereto, and a circuit for providing a selectively inverted ping flag signal PING_FLAG in response to the converted enable signal PDEN to the counter 130 may be implemented in various ways.

The counter 130 may receive the clock signal CLK, and output a counting value CV obtained by counting the clock signal CLK. The AND gate ANDG may provide the inverted ping flag signal PING_FLAG to the counter 130 when the ping enable signal PING_EN is at a low level, and the counter 130 may be reset when the ping enable signal PING_EN is at a high level. When the ping enable signal PING_EN is at a low level, the counter 130 may count a high level period of the inverted ping flag signal PING_FLAG by using the clock signal CLK. For example, when the ping enable signal PING_EN is at a low level, the counter 130 may count a low level section of the ping flag signal PING_FLAG by using the clock signal CLK received from the clock generator 110, and may output the counting value CV as a digital signal. However, the counter 130 may be reset when the ping flag signal PING_FLAG is at a high level.

The counter 130 may output the counting value CV to the digital comparator 140. The digital comparator 140 may compare a reference digital value RDV with the counting value CV, and output a comparison result as a switching signal CR. The digital comparator 140 may perform a comparison operation in response to the inverted enable signal PDEN. When the inverted enable signal PDEN is at a high level, the digital comparator 140 may compare the reference digital value RDV with the counting value CV. For example, when the reference digital value RDV is greater than the counting value CV, the switching signal CR of a high level may be output, and when the reference digital value RDV is less than the counting value CV, the switching signal CR of a low level may be output.

The reference digital value RDV may be a reference value for determining a section in which the ping is not received. For example, the reference digital value RDV may correspond to the reference time in operation S240 in FIG. 4. In an example embodiment, the reference digital value RDV may be a value that has been preset in a memory inside the power sensing circuit 100, or may be a value that has been preset in a memory inside the power receiving device 10. Alternatively, in an example embodiment, the reference digital value RDV may be a value that is varied by the processor 13.

The power sensing circuit 100 may include a transistor TR and resistors R1 and R2. The switching signal CR output from the digital comparator 140 may be provided to the transistor TR, and the transistor TR may output the sensing result signal PDET_B via the second pin P2 in response to the switching signal CR. Accordingly, when the reference digital value RDV is greater than the counting value CV, the sensing result signal PDET_B of a low-level may be output, and when the reference digital value RDV is less than the counting value CV, the sensing result signal PDET_B of a high level may be output.

A power supply voltage VPP generated inside the power receiving device 10 may be provided to the clock generator 110, the counter 130, the digital comparator 140, and the resistors R1 and R2. In addition, the flag signal generator 120 may also operate by using the power supply voltage VPP. Accordingly, even when the power transmitted from the power transmitting device 20 is cut off, the power detection circuit 100 may operate by using the power voltage VPP generated internally.

The processor 13 may provide a ping enable signal PING_EN to the power sensing circuit 100 to perform the ping sensing operation. The power sensing circuit 100 may perform the ping sensing operation in response to the ping enable signal PING_EN, and provide the sensing result signal PDET_B according to the performance result to the processor 13. For example, when the ping enable signal PING_EN is at a high level, the power sensing circuit 100 may not perform the ping detection operation, and when the ping enable signal PING_EN changes from a high level to a low level, the power sensing circuit 100 may perform the ping sensing operation. When the sensing result signal PDET_B changes from a low level to a high level, the processor 13 may determine that the ping has not been received from the power transmitting device, and may determine that a state is the power cutoff mode (S30) in which the power receiving device 10 is disconnected from the power transmitting device 20.

An electronic device according to a comparative example may include a separate capacitor and a separate resistor, which are formed outside a power sensing circuit and connected to an output pin of the power sensing circuit. Because charges are accumulated in the separate capacitor when a ping is received and discharged when the ping is not received, the power sensing circuit of the electronic device according to the comparative example may sense a receiving state of wireless power by measuring a voltage according to a charge amount stored in the separate capacitor. In the electronic device according to the comparative example, because sensing accuracy is determined according to capacitance and resistance values of the separate capacitor and resistors, respectively, there has been an issue that a capacitor having a relatively large capacitance needs to be provided.

The power receiving device 10 according to the technical idea of the inventive concept may be formed outside the power detection circuit 100, and may not include the separate capacitor and resistor connected to the output pin of the power sensing circuit 100. The power sensing circuit 100 may count the waveform of the ping flag signal PING_FLAG by using the clock signal CLK, and may sense a wireless power receiving state, that is, the ping by comparing the counted counting value CV with the reference digital value RDV. Accordingly, by not including the separate capacitor and resistor for detecting the ping, the power receiving device 10 may increase space efficiency, the sensing accuracy, and the sensing speed of the wireless power receiving state.

Referring to FIGS. 5 and 6, when the ping enable signal PING_EN transitions from a high level to a low level, the clock signal CLK may be generated, and the sensing result signal PDET_B may be converted from a high level to a low level. For example, when the ping enable signal PING_EN transitions from a high level to a low level, the power sensing circuit 100 may start the ping sensing operation.

The power receiving device 10 may transmit the PHM packet to the power transmitting device 20 after the ping enable signal PING_EN transitions from a high level to a low level. The power transmitting device 20 may provide the ping to the power receiving device 10 so that, when the PHM packet is received from the power receiving device 10, the rectified voltage VRECT that periodically alternates between a high level and a low level is generated. Accordingly, the rectified voltage VRECT may alternate between a high level and a low level with a constant period (for example, a ping period PP).

The flag signal generator 120 may generate the ping flag signal PING_FLAG having a square wave and the same period as a period of the rectified voltage VRECT, that is, the ping period PP. For example, the ping flag signal PING_FLAG may have a high level when the rectified voltage VRECT is at a high level, and may have a low level when the rectified voltage VRECT is at a low level. In this case, when the rectified voltage VRECT is at a high level while the ping is being received, the power receiving device 10 may transmit the SS packet to the power transmitting device 20 as a response to the ping.

The counter 130 may count the low level section LP of the ping flag signal PING_FLAG by using the clock signal CLK, and output the counting value CV according to the counting result. The counting value CV may be reset when the ping flag signal PING_FLAG is at a high level.

When the counting value CV becomes equal to or greater than the reference digital value RDV corresponding to a maximum detection time DT, the sensing result signal PDET_B may transition from a low level to a high level.

For example, when the ping period PP of the ping flag signal PING_FLAG is about 400 ms, the reference time for determining the absence of the ping may be set, as the maximum detection time DT, to twice the period of the ping flag signal PING_FLAG, or about 800 ms. The reference digital value RDV corresponding to the reference time of about 800 ms may be set. The reference digital value RDV may be variously set, and may be changed.

Figure 7:
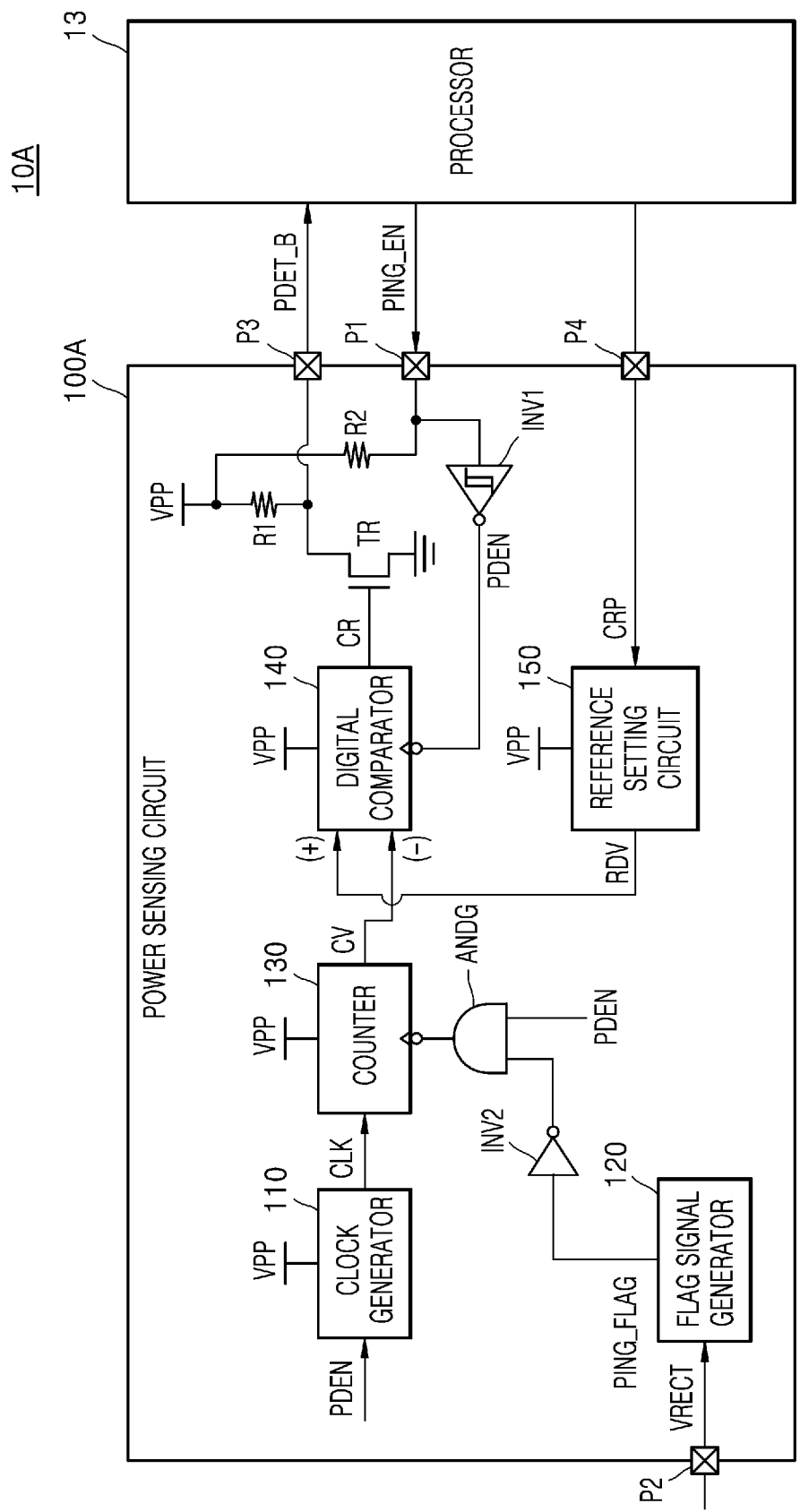
FIG. 7 is a diagram illustrating a power sensing circuit and a processor of a power receiving device, according to an example embodiment of the inventive concept.

FIG. 7 is a diagram illustrating a power sensing circuit 100A and the processor 13 of a power receiving device 10A, according to an example embodiment of the inventive concept. In the description with reference to FIG. 7, repeated descriptions of the same reference numerals as in FIG. 5 are omitted.

Referring to FIG. 7, the power receiving device 10A may include the power sensing circuit 100A for sensing the wireless power provided by a power transmitting device, and the processor 13 for controlling the overall operation of the power receiving device 10A. The power sensing circuit 100A may include the clock generator 110, the flag signal generator 120, the counter 130, the digital comparator 140, and a reference setting circuit 150.

When the ping enable signal PING_EN of a certain level (for example, a low level) is received from the processor 13, the power sensing circuit 100A may perform the ping sensing operation by using the rectified voltage VRECT, and may output a result of performing the ping sensing operation to the processor 13 as the sensing result signal PDET_B. In an example embodiment, the power sensing circuit 100 may include first through fourth pins P1 through P4. The power sensing circuit 100 may receive the ping enable signal PING_EN from the processor 13 via the first pin P1, receive a rectified voltage VRECT from the power converting circuit (for example, power converting circuit 300 in FIG. 1) via the second pin P2, and output the sensing result signal PDET_B to the processor 13 via the third pin P3.

In an example embodiment, the power sensing circuit 100A may communicate with the processor 13 via the fourth pin P4, and may receive a control signal. For example, the power sensing circuit 100A and the processor 13 may communicate with each other via an inter-integrated circuit (I2C) bus. The power sensing circuit 100A may receive a reference value control signal CRP via the fourth pin P4.

The reference setting circuit 150 may set the reference digital value RDV in response to the reference value control signal CRP received from the processor 13, and may output the reference digital value RDV to the digital comparator 140. The digital comparator 140 may compare the reference digital value RDV output from the reference setting circuit 150 with the counting value CV. For example, the reference digital value RDV may be set to have a value corresponding to twice the ping period PP.

In an example embodiment, the processor 13 may transmit the reference value control signal CRP in the power charging mode S10, and, that is, before the rectified voltage VRECT becomes about 0 V, the reference value control signal CRP may be transmitted to the reference setting circuit 150. The reference setting circuit 150 may set the reference digital value RDV.

In an example embodiment, the reference setting circuit 150 may be driven by using the power voltage VPP inside the power receiving device 10A. Accordingly, the power receiving device 10A may drive the wireless power sensing circuit 100A even when the wireless power is not received from the power transmitting device 20.

Figure 8:
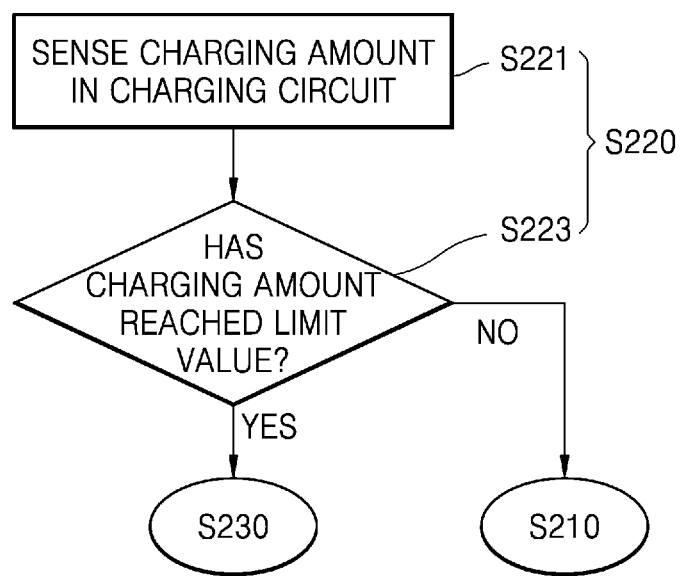
FIG. 8 is a flowchart of an operation method of a power receiving device in a wireless power charging system, according to an example embodiment of the inventive concept.

FIG. 8 is a flowchart of an operation method of a power receiving device in a wireless power charging system, according to an example embodiment of the inventive concept. Operation S220 in FIG. 8 may be an example of operation S220 in FIG. 4. Operation S220 in FIG. 8 may include operations S221 and S223.

Referring to FIG. 8, the power receiving device 10 may sense a charging amount of a battery included in the power charging circuit (for example, power charging circuit 400 in FIG. 1) (S221). The power receiving device 10 may determine whether the charging amount has reached a limit value (S223). In this case, the limit value may mean an upper limit value.

For example, when the charging amount has not reached the limit value (S223, No), the power receiving device may perform operation S210 in FIG. 4. The power receiving device 10 may determine that when the charging amount of the power charging circuit has not reached the limit value, the battery is in a rechargeable state and the power charging mode S10 is maintainable.

However, when the charging amount has reached the limit value (S223, Yes), the power receiving device 10 may perform operation S230 in FIG. 4. The power receiving device 10 may determine that it is difficult to maintain the power charging mode S10 when the charging amount of the power charging circuit reaches the limit value, and may change the power mode from the power charging mode S10 to the power hold mode S20 to reduce the charging speed.

Figure 9:
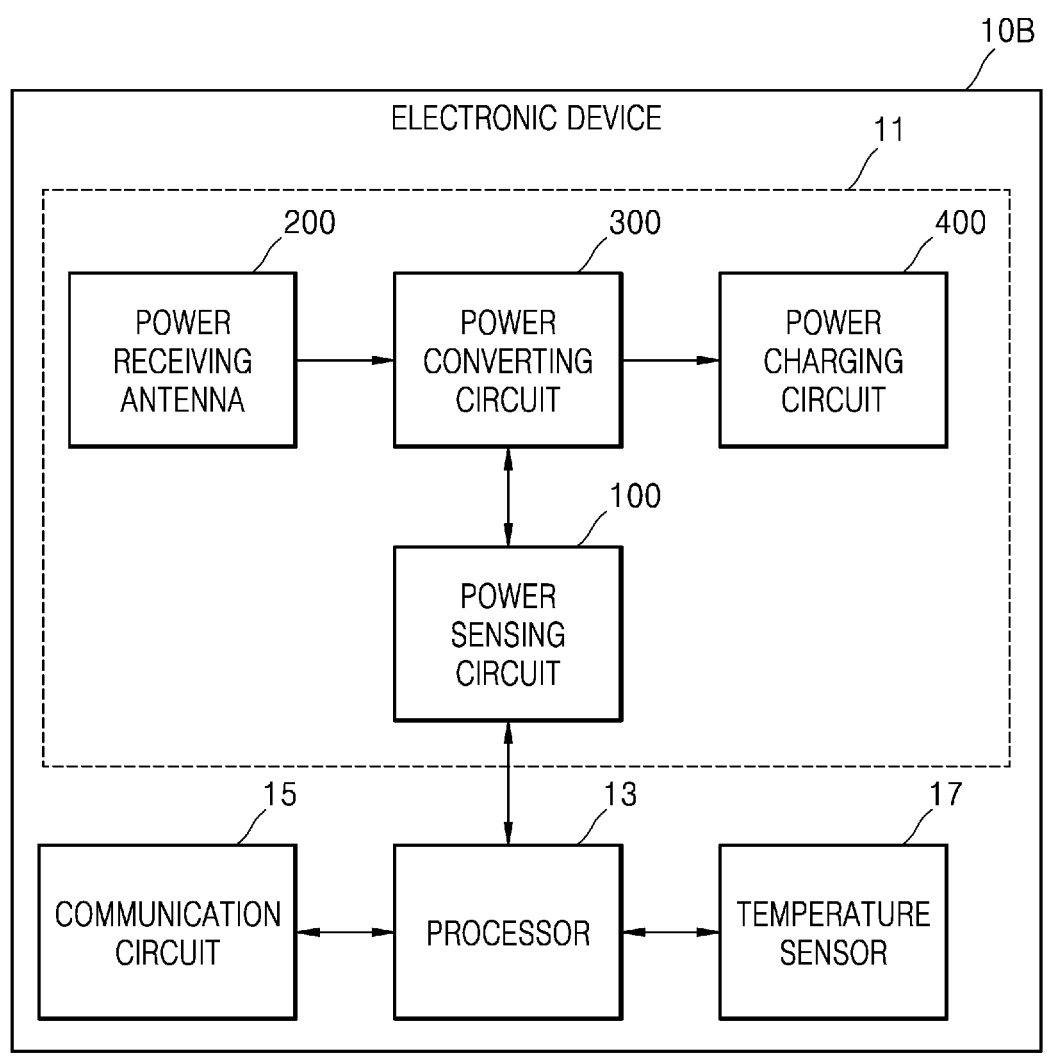
FIG. 9 is a diagram of an electronic device, according to an example embodiment of the inventive concept.
Figure 10:
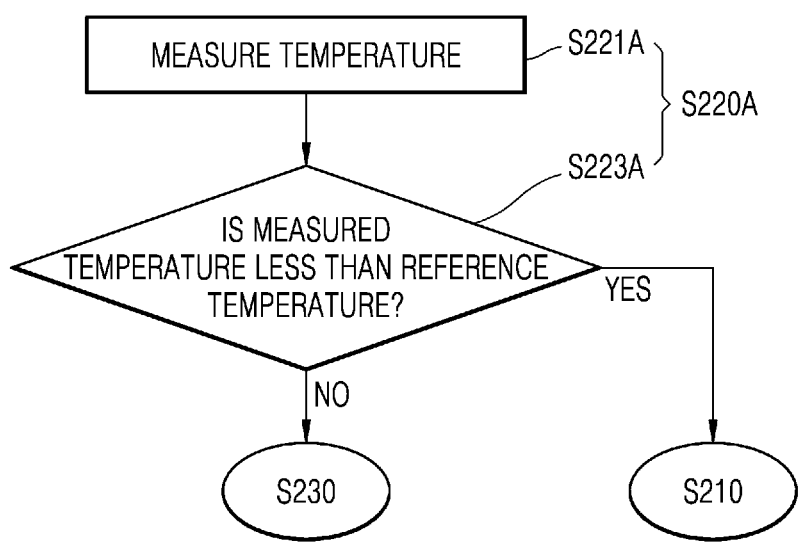
FIG. 10 is a flowchart of an operation method of a power receiving device in a wireless power charging system, according to an example embodiment of the inventive concept.

FIG. 9 is a diagram of an electronic device 10B according to an example embodiment of the inventive concept. FIG. 10 is a flowchart of an operation method of a power receiving device in a wireless power charging system, according to an example embodiment of the inventive concept. In the description with reference to FIG. 9, repeated descriptions of the same reference numerals as in FIG. 1 are omitted. Operation S220A in FIG. 10 may include an example of operation S220 in FIG. 4. Operation S220A in FIG. 10 may include operations S221A and S223A.

Referring to FIG. 9, the electronic device 10B may be referred to as a power receiving device 10B receiving the wireless power from a power transmitting device (for example, power transmitting device 20 in FIG. 1). The power receiving device 10B may include the power receiving circuit 11, the processor 13, and the communication circuit 15.

The power receiving device 10B may further include a temperature sensor 17. The temperature sensor 17 may measure the internal temperature of the power receiving device 10B. The temperature sensor 17 may start measuring temperature as the wireless power is received by the power receiving device 10B. For example, the temperature sensor 17 may perform a temperature measurement operation periodically according to a certain period, or may perform the temperature measurement aperiodically. The temperature sensor 17 may measure the temperature of one point in the power receiving device 10B, and may measure the element temperature of at least one of, for example, the power sensing circuit 100, the power receiving antenna 200, the power converting circuit 300, the power charging circuit 400, the processor 13, and the communication circuit 15.

The processor 13 may receive temperature information measured by the temperature sensor 17, and may manage temperature information. The processor 13 may change the power mode of the power receiving device 10B based on the temperature information.

In FIG. 9, only the temperature sensor 17 included in the electronic device 10B is illustrated, but the power receiving device 10B may include a sensor module capable of various sensing operations. The sensor module may sense an operating state (for example, power or temperature) of the power receiving device 10B, or an external environmental state (for example, a user state), and generate a signal corresponding to the sensed state. For example, the sensor module may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

Referring to FIGS. 9 and 10, the power receiving device 10B may measure the temperature therein (S221A). For example, the temperature of at least one of the components included in the power receiving device 10B may be measured.

The power receiving device 10B may determine whether the measured temperature is less than the reference temperature (S223A). In an example embodiment, the reference temperature may mean a limit temperature at which a component in which the temperature is measured operates normally.

When the measured temperature is less than the reference temperature (S223A, Yes), the power receiving device 10B may perform operation S210 in FIG. 4. The power receiving device 10B may maintain the power charging mode S10.

However, when the measured temperature is equal to or higher than the reference temperature (S223A, No), the power receiving device 10B may perform operation S230 in FIG. 4. The power receiving device 10B may determine that it is difficult to maintain the power charging mode S10 when the internal temperature of the power receiving device 10B reaches the reference temperature, and may change the power mode from the power charging mode S10 to the power hold mode S20 to reduce the temperature by reducing the charging speed.

In an example embodiment, the temperature sensor 17 may measure respective temperatures of a plurality of components of the power receiving device 10B, and the measured temperatures may be compared with corresponding reference temperatures (S220A). When each of the measured temperatures is less than the corresponding reference temperature, operation S210 in FIG. 4 may be performed, but when at least one of the measured temperatures is greater than or equal to the corresponding reference temperature, operation S230 in FIG. 4 may be performed.

Figure 11:
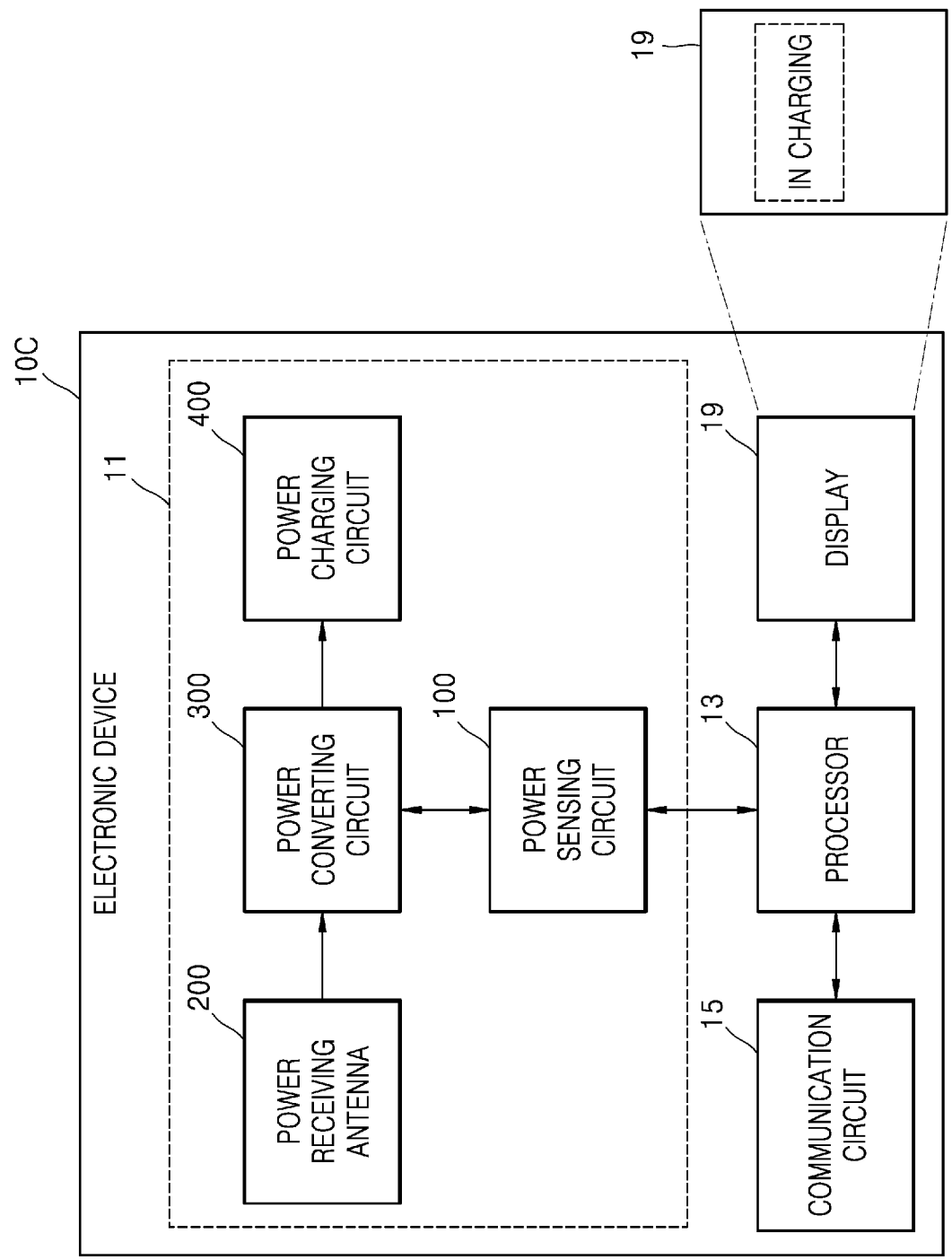
FIG. 11 is a diagram of an electronic device, according to an example embodiment of the inventive concept.

FIG. 11 is a diagram of an electronic device 10C according to an example embodiment of the inventive concept. In the description with reference to FIG. 11, repeated descriptions of the same reference numerals as in FIG. 1 are omitted.

Referring to FIG. 11, the electronic device 10C may be referred to as a power receiving device 10C receiving the wireless power from a power transmitting device (for example, power transmitting device 20 in FIG. 1). The power receiving device 10C may include the power receiving circuit 11, the processor 13, the communication circuit 15, and a display 19. The display 19 may be a device for visually providing information about the power receiving device 10C to a user of the power receiving device 10C. The display 19 may include a touch circuitry or a pressure sensor capable of measuring intensity of pressure applied by a touch.

The display 19 may indicate to the user that it is in a "charging" state in a power charging mode (for example, power charging mode S10 in FIG. 2). In the power charging mode S10, the processor 13 may control a graphical user interface (GUI), and may display to the user that the power receiving device 10C is in a charging state. Alternatively, in an example embodiment, in the power charging mode S10, the power receiving device 10C may display the charging state to the user by light emitting elements emitting particular colors.

In addition, the display 19 may indicate to the user that it is in the "charging" state in the power hold mode (for example, S20 in FIG. 2). For example, in the power hold mode S20, the power receiving device 10C may display to the user the same state as a state of the power charging mode S10, that is, the charging state. Therefore, in the power hold mode S20, even when a state in which power is supplied to the power receiving device 10C and a state in which power is cut off are repeated, confusion of the user may be prevented by displaying constantly the "charging" state without displaying that the power is cut off to the user.

However, the display 19 may display to the user that the power receiving device 10C is in a state in which wireless charging is cut off in the power cutoff mode (for example, power cutoff mode S30 in FIG. 2). Alternatively, in an example embodiment, in the power cutoff mode S30, the power receiving device 10C may display to the user that the charging is cut off, by the light emitting elements emitting particular colors or cutting off wireless power from the light emitting elements.

While the inventive concept has been particularly shown and described with reference to embodiments thereof, it will be understood that various changes in form and details may be made therein without departing from the spirit and scope of the following claims.

What is claimed is:

1. An electronic device configured to operate in a plurality of power modes, the electronic device comprising:
a power receiving circuit configured to receive wireless power from an external power transmitting device; and a processor configured to control an operation of the electronic device, wherein the plurality of power modes comprise a power charging mode in which the wireless power is continuously provided, a power hold mode including a state in which the wireless power is provided and a state in which the wireless power is cut off are periodically repeated in a ping period, and a power cutoff mode in which the wireless power is continuously cut off, wherein the power receiving circuit is configured to generate a ping flag signal that alternates between a high level and a low level with the ping period in the power hold mode, and change the power mode based on a counting value obtained by counting particular level sections of the ping flag signal, wherein the power receiving circuit comprises a power converting circuit configured to rectify the received wireless power and generate a rectified voltage, and wherein the power receiving circuit is configured to generate a ping flag signal having a square wave, having a high level when the rectified voltage is above a certain value, and having a low level when the rectified voltage is less than a certain value.

2. The electronic device of claim 1, wherein the power receiving circuit further comprises:
 a power sensing circuit configured to generate a sensing result signal according to a result of sensing a receiving state of the wireless power in response to a ping enable signal received from the processor.

3. The electronic device of claim 2, wherein the power sensing circuit comprises:
 a flag signal generator configured to generate the ping flag signal from the rectified voltage;
 a counter configured to generate the counting value generated by counting particular level sections of the ping flag signal;
 a digital comparator configured to generate a switching signal by comparing the counting value with a reference digital value; and
 an output pin configured to output the sensing result signal according to the switching signal.

4. The electronic device of claim 3, wherein the counter and the digital comparator operate by receiving a power voltage generated in the electronic device.

5. The electronic device of claim 3, wherein the power sensing circuit further comprises a clock generator configured to generate and output a clock signal to the counter according to the ping enable signal.

6. The electronic device of claim 3, wherein the power sensing circuit further comprises a reference setting circuit configured to generate and output the reference digital value to the digital comparator, according to a reference value control signal received from the processor.

7. The electronic device of claim 1, wherein the processor operates by changing a power mode to the power hold mode, when an internal temperature of the electronic device is equal to or greater than a reference temperature while operating in the power charging mode.

8. The electronic device of claim 1,
 wherein the power receiving circuit further comprises a power charging circuit charged by the wireless power, and
 wherein the processor operates by changing a power mode to the power hold mode, when the power charging circuit reaches a limit charging amount in the power charging mode.

9. An electronic device receiving wireless power from a power transmitting device, the electronic device comprising:
 a power receiving circuit configured to receive power from an external power transmitting device; and
 a processor configured to control the power receiving circuit,
 wherein the power receiving circuit comprises:
  a power converting circuit configured to rectify the received power and generate a rectified voltage; and
  a power sensing circuit configured to output a sensing result signal according to a result of sensing a receiving state of the power in response to a ping enable signal received from the processor,
 wherein the power sensing circuit outputs the sensing result signal, according to a result of counting particular level sections of a ping flag signal alternating between a high level and a low level in a same period as a period of the rectified voltage, and
 wherein the power sensing circuit is configured to generate a ping flag signal having a square wave, having a high level when the rectified voltage is above a certain value, and having a low level when the rectified voltage is less than a certain value.

10. The electronic device of claim 9, wherein the power sensing circuit comprises:
 a flag signal generator configured to generate flag signal from the rectified voltage;
 a counter configured to generate a counting value by counting particular level sections of the ping flag signal;
 a digital comparator configured to generate a switching signal by comparing the counting value with a reference digital value; and
 an output pin configured to output the sensing result signal according to the switching signal.

11. The electronic device of claim 10, wherein the counter and the digital comparator operate by receiving a power voltage generated in the electronic device.

12. The electronic device of claim 10, wherein the power sensing circuit further comprises a reference setting circuit configured to generate and output the reference digital value to the digital comparator, according to a reference value control signal received from the processor.

13. The electronic device of claim 9, wherein the processor transmits a power hold mode packet via a communication circuit, when an internal temperature of the electronic device is equal to or greater than a reference temperature.

14. The electronic device of claim 9,
 wherein the power receiving circuit further comprises a power charging circuit charged by the rectified voltage, and
 wherein the processor transmits a power hold mode packet via a communication circuit, when the power charging circuit reaches a limit charging amount.

15. The electronic device of claim 9, wherein the processor transmits a signal strength packet via a communication circuit, when the rectified voltage alternating between a high level and a low level has the high level.

16. A power receiving circuit comprising:
 a power converting circuit configured to generate a rectified voltage by rectifying power received from outside the power receiving circuit; and
 a power sensing circuit configured to output a sensing result signal according to a result of sensing a receiving state of the power, in response to a ping enable signal received from a processor, wherein the power sensing circuit comprises:
- a flag signal generator configured to generate a ping flag signal from the rectified voltage;
- a counter configured to generate a counting value by counting particular level sections of the ping flag signal;
- a digital comparator configured to generate a switching signal by comparing the counting value with a reference digital value; and
- a first pin configured to output the sensing result signal according to the switching signal, and wherein the flag signal generator is configured to generate a ping flag signal having a square wave, having a high level when the rectified voltage is above a certain value, and having a low level when the rectified voltage is less than a certain value.

17. The power receiving circuit of claim 16, wherein the power sensing circuit further comprises a clock generator configured to generate and output a clock signal to the counter, according to the ping enable signal.

18. The power receiving circuit of claim 16, wherein the power sensing circuit further comprises a second pin different from the first pin and configured to receive the ping enable signal.

19. The power receiving circuit of claim 16,
wherein the power sensing circuit further comprises a third pin communicating with an external processor; and a reference setting configured to generate and output the reference digital value to a digital comparator, and wherein the reference setting circuit generates the reference digital value according to a reference value control signal received via the third pin.

20. The power receiving circuit of claim 19, wherein the reference setting circuit receives the reference value control signal before the rectified voltage becomes 0 V.

* * * * *